US009392770B2

(12) United States Patent
Almeida

(10) Patent No.: US 9,392,770 B2
(45) Date of Patent: Jul. 19, 2016

(54) PET LEASH WITH INTEGRATED SAFETY BELT CONNECTOR

(71) Applicant: Hernan Almeida, Mount Prospect, IL (US)

(72) Inventor: Hernan Almeida, Mount Prospect, IL (US)

( * ) Notice: Subject to any disclaimer, the term of this patent is extended or adjusted under 35 U.S.C. 154(b) by 162 days.

(21) Appl. No.: 14/185,337

(22) Filed: Feb. 20, 2014

(65) Prior Publication Data

US 2014/0165925 A1  Jun. 19, 2014

Related U.S. Application Data

(63) Continuation-in-part of application No. 13/564,163, filed on Aug. 1, 2012, now abandoned.

(51) Int. Cl.
*A01K 27/00* (2006.01)
*B60R 22/10* (2006.01)

(52) U.S. Cl.
CPC .............. *A01K 27/004* (2013.01); *A01K 27/005* (2013.01); *B60R 22/10* (2013.01)

(58) Field of Classification Search
CPC ... A01K 27/00; A01K 27/004; A01K 27/003; Y10T 24/4093; B65H 75/34; B65H 75/4431; B65H 75/4423; B60R 2011/0031; B60R 22/10
USPC ......... 119/771, 792, 793, 794, 795, 796, 797, 119/798; 24/200; 7/118, 119, 167, 168; 224/275

See application file for complete search history.

(56) References Cited

U.S. PATENT DOCUMENTS

| | | | |
|---|---|---|---|
| 4,796,566 A * | 1/1989 | Daniels | A01K 1/04 119/789 |
| 5,131,682 A | 7/1992 | Reed | |
| 5,724,920 A | 3/1998 | Meisman et al. | |
| 6,253,713 B1 | 7/2001 | Giedeman, III et al. | |
| 6,637,377 B2 | 10/2003 | Lobanoff et al. | |
| 7,003,833 B2 * | 2/2006 | Feliciano | B25F 1/04 30/155 |
| 7,699,348 B2 | 4/2010 | Singh | |
| 8,056,927 B2 | 11/2011 | Singh | |
| D688,424 S | 8/2013 | Stanley | |
| 2004/0237906 A1 | 12/2004 | Waxman et al. | |
| 2007/0131177 A1 * | 6/2007 | Perkitny | A01K 27/004 119/796 |
| 2011/0083617 A1 | 4/2011 | Townsend et al. | |
| 2012/0204812 A1 | 8/2012 | Singh | |

FOREIGN PATENT DOCUMENTS

CN  201308048 Y  9/2009

* cited by examiner

*Primary Examiner* — Trinh Nguyen
(74) *Attorney, Agent, or Firm* — Husch Blackwell LLP; George S. Pavlik

(57) ABSTRACT

An improved leash device for pets that includes a tongue for insertion into a seat belt is described. The tongue may be designed to fit any vehicle safety belt buckle to allow a user to secure their pet to their vehicle for travel. The user may operate the device by moving a safety belt tongue from inside the housing of the leash device. When the tongue is moved outside the housing, it may be inserted into the buckle attached inside the vehicle to keep the pet safe during vehicle movement. The leash device may also include a retractable leash mechanism with a lock button for alternatively allowing or preventing the extension/retraction of the leash. A button hood may be provided to prevent accidental toggling of the lock button.

15 Claims, 4 Drawing Sheets

PET LEASH WITH INTEGRATED SAFETY BELT CONNECTOR

The present application is a continuation-in-part of and claims priority under 35 U.S.C. §120 to U.S. application Ser. No. 13/564,163 filed Aug. 1, 2012.

BACKGROUND OF INVENTION

Pet owners occasionally wish to take their pets for a vehicle ride and secure their pet to the vehicles' seat belt device for safety reasons. Currently available retractable leashes that have seat belt connectors (also referred to herein as "tongues" or "male connectors") are not reliably safe because the connectors attached to those products are not attached firmly to the leash. Instead, the connectors typically are attached by fabric that makes the dog carry the weight of the leash. These designs do not properly prevent the pet from tripping over the leash while the leash is secured in a vehicle seat belt device. Also, the buttons or mechanisms for locking the retractable leash are exposed (usually on top of the retractable leash) and can be easy triggered, for example, by the feet of the dog, releasing the lock button. Moreover, because the connector hangs loosely away from the main body of the leash when the latch is not in use, it can swing and cause damage to persons, pets, or other objects. Similarly, the connector itself can be damaged because it is exposed.

SUMMARY OF THE INVENTION

A pet leash device may include a housing and a tongue connected to the housing. The tongue may be adapted to engage a safety belt buckle to allow a user to secure their pet to their vehicle for travel. The tongue may be movable between a first position in which a portion of the first section of the tongue is inside the housing of the leash device and a second position in which the tongue can be inserted into the safety belt buckle. The user may operate by rotating the tongue from inside the housing of the leash device. When the tongue is rotated out of the housing, the leash device may then be inserted into the buckle attached inside the vehicle to keep the pet safe during vehicle movement. The leash device may also include a retractable leash mechanism with a lock button for alternatively allowing or preventing the extension/retraction of the leash. A button hood may be provided to prevent accidental toggling of the lock button.

DETAILED DESCRIPTION OF THE PREFERRED EMBODIMENTS

Figure 1:
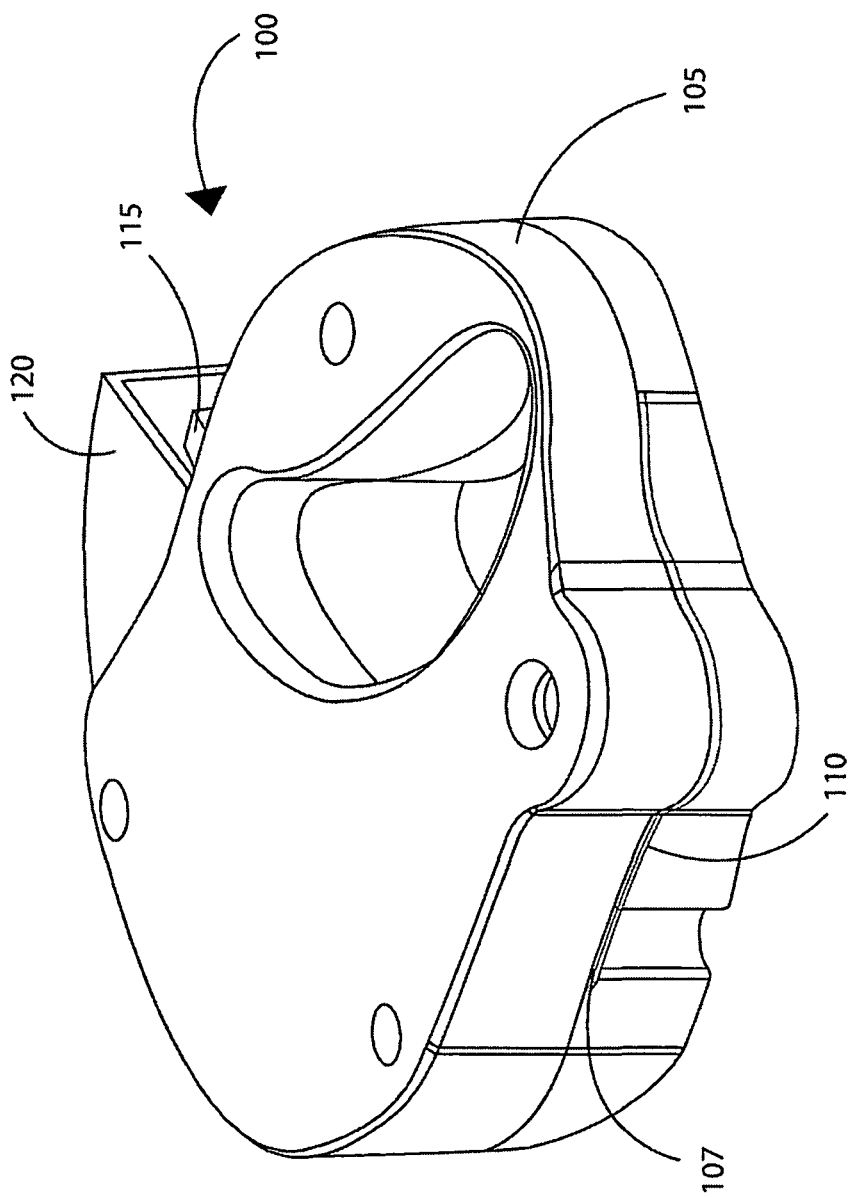
FIG. 1 shows an embodiment of a retractable pet leash device with a safety belt connector positioned substantially inside the housing of the device.

Referring to the drawings, and initially to FIG. 1, a retractable leash device 100 with a seat belt tongue (or male connector) 110 is shown. The leash device 100 includes a housing 105, a seat belt tongue 110, a lock button 115, a button hood 120, and a retractable leash (not shown). The housing 105 may be made of any suitable material, such as plastic or metal. Other materials, or a combination of materials, may also be used. Preferably, the housing 105 includes an opening for inserting an operator's hand.

A leash and a retractor device for retracting the leash are disposed within the housing 105. The leash and retractor may be any known leash and/or retractor device. For example, the leash may include a hook for attaching the leash to a pet collar, as known in the art.

The retractor device (not shown) may be a spring-biased retractor device for extending and/or retracting the leash, such as a retractable leash device similar to the one described in U.S. Pat. No. 7,040,257, which is hereby incorporated by reference to the fullest extent of the law. For example, a spring-biased reel may be provided around which a leash is wound. Other retractor devices may also be used. The pet leash device 100 includes a lock button 115 that, in operation, alternatively allows and prevents the retraction/extension of the leash as known.

Figure 4:
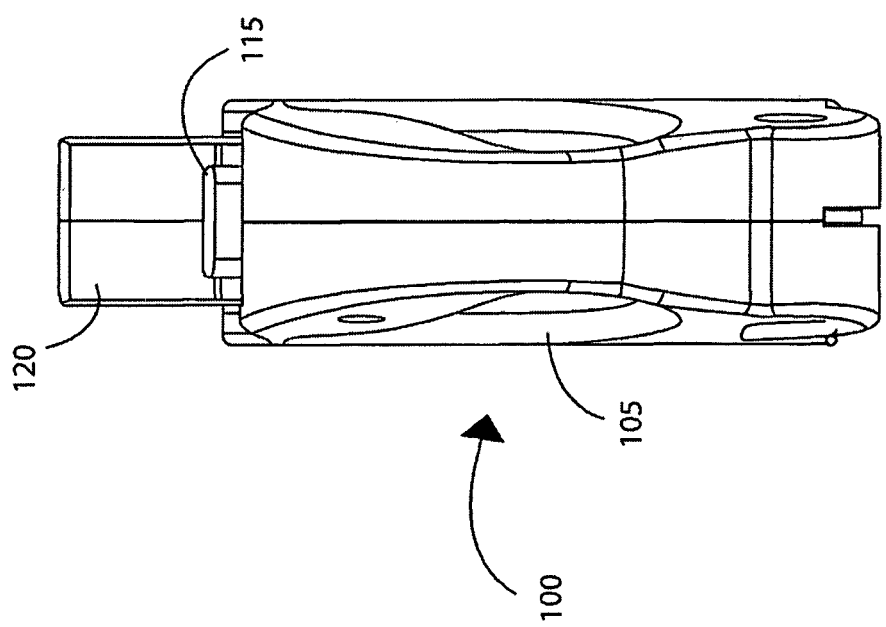
FIG. 4 shows a back view of an embodiment of a retractable pet leash device with a hood that protects the lock button for a retractor device of the leash.

In some embodiments, the device 100 also includes a button hood 120 positioned over the lock button 115. The button hood 120 acts to shield the lock button 115 from inadvertent activation or toggling. The button hood 120 may be made of the same material as the housing 105, or may be made of another material. A back view of the device 100 showing the lock button 115 and button hood 120 is shown in FIG. 4. Preferably, the button hood 120 is rigid enough to withstand the force that may be applied by a pet, such as a large dog. The button hood 120 preferably is dimensioned to allow access to the button by a human finger. By protecting the lock button 105 with the hood 120, the likelihood of accidental toggling of the button by a dog or other animal attached to the leash is reduced. The lock button 115 may be partially covered by the button hood 120, or the lock button 115 may be fully covered by the button hood 120.

Figure 2:
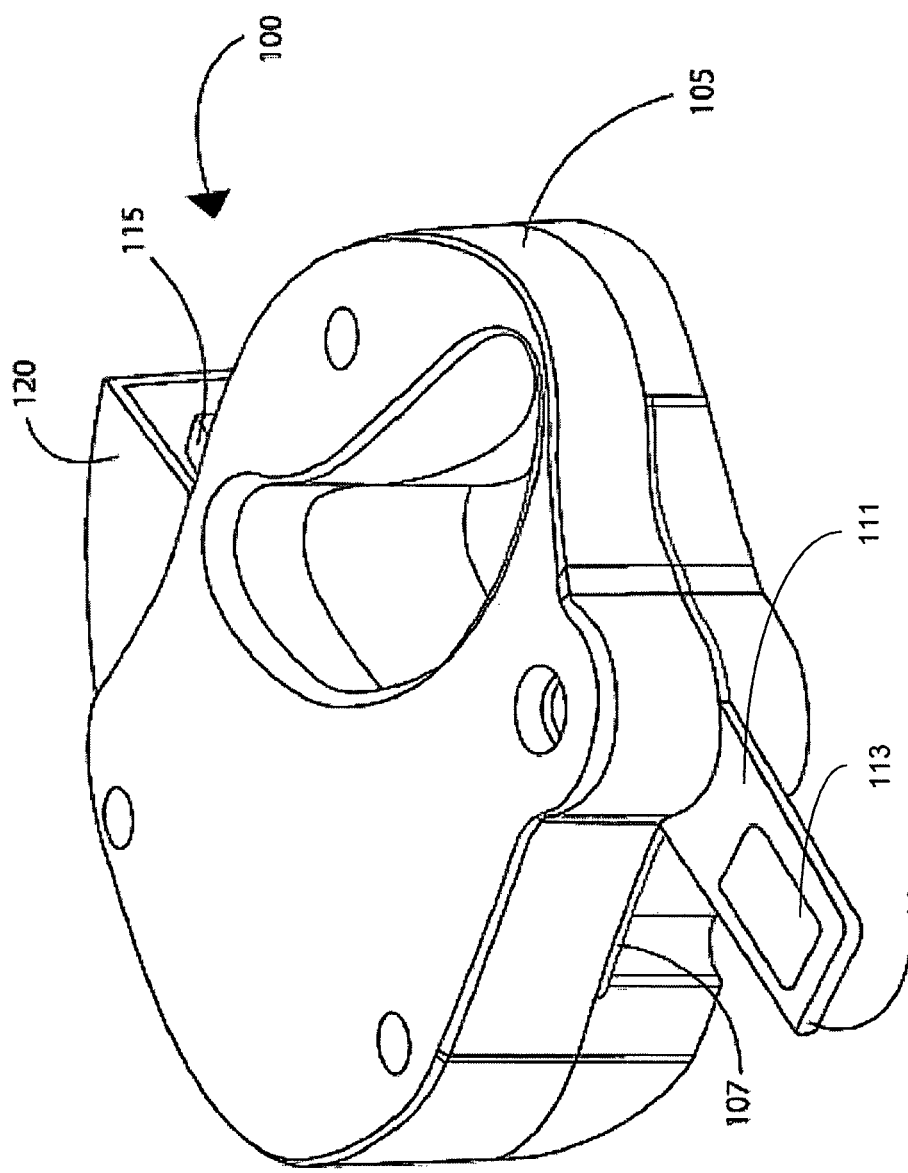
FIG. 2 shows the embodiment of FIG. 1 with a safety belt connector positioned for insertion into a safety belt buckle.

Returning to FIG. 1, the device 100 also includes a seat belt tongue or male connector 110 adapted to be inserted into a seat belt buckle. Preferably the tongue 110 is metal, though any suitable rigid material may be used. As illustrated in FIG. 2, the tongue includes a substantially planar section 111 with an opening 113 therethrough. The tongue 110 is shown in a first position in which a portion of the part of the tongue 110 that engages the safety belt buckle is inside the housing. For example, in the embodiment shown in FIG. 1, the tongue 110 lies substantially inside a slot 107 in the housing 105. A portion of the tongue 110 may be exposed in the first position, for example, to allow the user to pull the tongue 110 out of the slot 107. When the tongue 110 is in the first position, the risk of potential damage to the tongue 110 or, conversely, damage by the tongue 110 to the pet, leash operator, and/or other beings and things is reduced.

Figure 3:
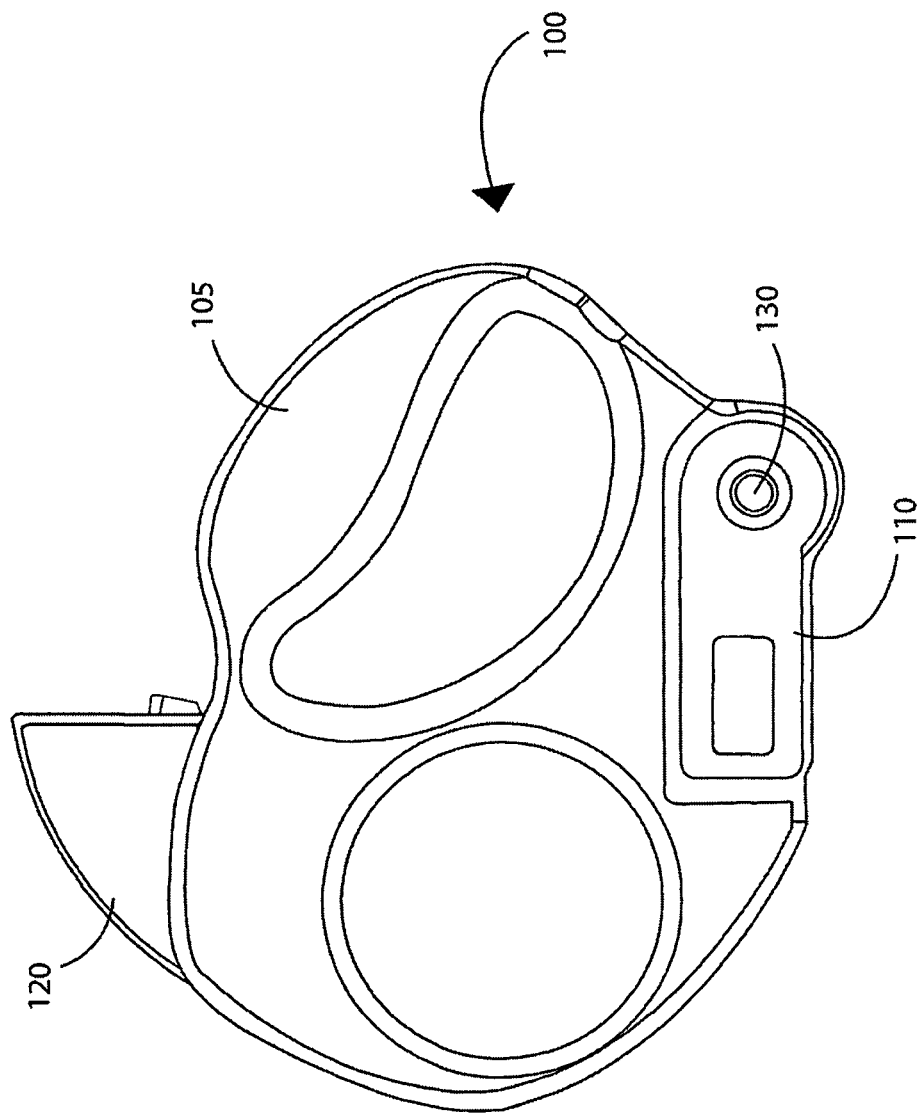
FIG. 3 shows a cutaway view of a retractable leash with a safety belt connector.

FIGS. 2 and 3 illustrate the operation of the seat belt connector 110 in some embodiments of the device 100. In FIG. 2, the device 100 is shown with a seat belt connector 110 in a second position in which the tongue 110 is positioned outside the housing 105 of the device 100. When the tongue 110 is in the second position, the tongue 110 can be inserted into a seat belt buckle to attach the device 100 to the vehicle's safety restraint device. Similarly, the tongue 110 may be inserted into any device having a safety belt buckle. The tongue 110 may be sized to fit a standard seat belt buckle. Tongue 110 also may be adapted to be inserted into non-standard buckle sizes.

FIG. 3 shows a cutaway view of an embodiment of a retractable leash with a seat belt connector positioned inside the housing of the device. In this embodiment, the device 100 includes a post 130 about which the tongue 110 can rotate.

Alternatively, or additionally, the tongue 110 may be connected to a spring biased device for retracting and/or extending the tongue 110 inside or outside the housing 105. The device 100 also may include locking mechanisms for locking the tongue in either the first position (inside the housing), the second position (outside the housing), or in any other position.

Though the invention has been described with respect to specific preferred embodiments, many variations and modifications will become apparent to those skilled in the art upon reading the present application. The invention is therefore that the apprehended claims be interpreted as broadly as possible in view of the prior art to include all such variations and modifications.

I claim:

1. A pet leash device comprising:
a housing;
a tongue connected to the housing, the tongue including a first section insertable within a slot of a safety belt buckle, the first section being substantially planar with an opening therethrough, the tongue being movable between a first position in which a portion of the first section lies inside the housing and a second position in which the first section lies outside the housing; a spring-biased reel in the housing, a leash wound around the spring-biased reel; a lock button for triggering a lock mechanism that prevents rotation of the reel; and a hood attached to the housing and positioned over the lock button.

2. The pet leash device of claim 1, wherein the tongue is rotatable between the first position and the second position.

3. The pet leash device of claim 1, wherein the tongue is metal.

4. The pet leash device of claim 1, wherein the housing is plastic.

5. The pet leash device of claim 1, wherein the tongue lies substantially inside the housing when in the first position.

6. The pet leash device of claim 1 further comprising a tongue lock mechanism for locking the tongue in the first position.

7. The pet leash device of claim 1 further comprising a tongue lock mechanism for locking the tongue in the second position.

8. The pet leash device of claim 1 further comprising a tongue lock mechanism for alternatively locking the tongue in the first position and the second position.

9. The pet leash device of claim 1 further comprising a leash that is extendable from the housing.

10. The pet leash device of claim 9, wherein the button hood is plastic.

11. A pet leash device comprising:
a housing;
a spring-biased reel in the housing;
a leash that is extendable from the housing, the leash wound around the spring-biased reel;
a lock button for triggering a lock mechanism that prevents rotation of the reel;
a hood attached to the housing and positioned over the lock; and
a tongue connected to the housing, the tongue including a first section insertable within a safety belt buckle, the first section being substantially planar with an opening therethrough, the tongue being movable between a first position in which a portion of the first section lies inside the housing and a second position in which the first section lies outside the housing.

12. The pet least device of claim 11, wherein the housing is plastic, the button hood is plastic, and the tongue is metal.

13. The pet leash device of claim 11 further comprising a tongue lock mechanism for locking the tongue in the first position.

14. The pet leash device of claim 11 further comprising a tongue lock mechanism for locking the tongue in the second position.

15. The pet leash device of claim 11 further comprising a tongue lock mechanism for alternatively locking the tongue in the first position and the second position.

* * * * *